United States Patent [19]
Katashi

[11] Patent Number: 4,981,426
[45] Date of Patent: Jan. 1, 1991

[54] CLAMPING MECHANISM IN AN INJECTION MOLDING MACHINE

[76] Inventor: Katashi Aoki, deceased, Room No. 208, Yotsuya Attorneys at Law Bldg., 13, Samoncho, Shinjuku-ku, Tokyo, Japan, by Satoru Kimura, heir

[21] Appl. No.: 269,141

[22] PCT Filed: Feb. 27, 1988

[86] PCT No.: PCT/JP88/00217
§ 371 Date: Oct. 27, 1988
§ 102(e) Date: Oct. 27, 1988

[87] PCT Pub. No.: WO88/06513
PCT Pub. Date: Sep. 7, 1988

[30] Foreign Application Priority Data
Feb. 27, 1987 [JP] Japan .................. 62-45433

[51] Int. Cl.$^5$ ............................. B29C 45/80
[52] U.S. Cl. ..................... 425/150; 91/392; 92/162 R; 100/269 B; 100/273; 425/419; 425/451.2; 425/451.9; 425/590; 425/595

[58] Field of Search ............. 425/589, 590, 594, 595, 425/450.1, 451, 451.2, 451.9, 419, 150, DIG. 221, DIG. 223; 264/328.1; 100/269 R, 269 B, 273, 289; 91/392, 394, 396; 92/162 R

[56] References Cited
U.S. PATENT DOCUMENTS
4,861,259 8/1989 Takada .................. 425/595

FOREIGN PATENT DOCUMENTS
143915 7/1985 Japan .
2090787 7/1982 United Kingdom ........... 425/590

Primary Examiner—Timothy Heitbrink
Attorney, Agent, or Firm—Ostrolenk, Faber, Gerb & Soffen

[57] ABSTRACT

A clamping mechanism which includes a cylinder and a piston. The diameter of the piston is less than the internal diameter of a rear chamber of the cylinder such that fluid flows around the piston when the piston moves from an open position to an intermediate position. The diameter of the piston is equal to the internal diameter of a front chamber of the piston such that fluid cannot flow around the piston when the piston moves from the intermediate position to a closed position. To prevent cavitation within the cylinder, fluid is charged to the cylinder in accordance with the movement of the piston.

12 Claims, 4 Drawing Sheets

CLAMPING MECHANISM IN AN INJECTION MOLDING MACHINE

BACKGROUND OF THE INVENTION

1. Field of the Invention

The present invention relates to a clamping mechanism for use within an injection molding machine for molding synthetic resins.

2. Description of the Related Art

A clamping mechanism for opening and closing a mold is disclosed in Japanese patent application Laid-Open No. 60-143915. The mechanism includes means for reducing hydraulic resistance during the opening and closing of the mold. In particular, an internal diameter of a front chamber of a cylinder is larger than an internal diameter of a rear chamber of the cylinder, and a clearance is formed between the peripheral wall of the rear chamber of the cylinder and a piston.

In the above-described clamping mechanism, hydraulic resistance within the cylinder is reduced because oil can flow through the clearance around the periphery of the piston. But a large quantity of oil is required when a clamping ram is moved at high speed. Conventional pipes for receiving and supplying oil have small inlets and outlets. Hence, flowing-in-and-out of oil during operation of a large clamping mechanism is not smooth, and high-speed opening and closing cannot be carried out.

In view of the foregoing, the present inventor has developed means, as disclosed in Japanese Patent Application No. 61-276185, in which a front chamber of a cylinder and a rear chamber of the cylinder communicate with each other through a large diameter passage which can be opened and closed by a valve, whereby oil from the front chamber can be moved to the rear chamber through the passage during opening and closing of the mold. Thus, the flowability of oil within a large clamping mechanism is not impaired by pipe resistance and high-speed opening and closing can be carried out smoothly. However, cavitation tends to occur in the back of the piston because of a shortage of oil within the cylinder. Such cavitation increases the amount of time needed to establish the final clamping pressure.

A supply tank has been used in the prior art to supply oil to a cylinder as a piston moves out of the cylinder. But such a tank requires a valve and means for coordinating the operation of the valve with the movement of the piston. Such an arrangement is complicated and difficult to operate.

SUMMARY OF THE INVENTION

An object of the present invention is to provide an uncomplicated clamping mechanism which can accumulate and charge oil into a cylinder according to the movement of a piston without requiring valve operation.

The present invention relates to a clamping mechanism for use within an injection molding machine. The mechanism includes: a clamping cylinder with a front chamber and a rear chamber, the internal diameter of the rear chamber being greater than the internal diameter of the front chamber; and a main piston which is movable within the cylinder. The diameter of the outermost periphery of the piston is less than the internal diameter of the rear chamber of the cylinder such that fluid flows around the piston when the piston moves from an open position to an intermediate position. The diameter of the outermost periphery of the piston is equal to the internal diameter of the front chamber so that fluid cannot flow around the piston when the piston moves from the intermediate position to a closed position. The mechanism further includes a clamping ram which is fixed with respect to the main piston; and a booster ram which is coaxial with the clamping ram. The mechanism further includes charging means for supplying fluid to and for receiving fluid from the clamping cylinder. The charging means includes a charge cylinder, a charge piston which is movable within the charge cylinder and a charge piston rod. The charge piston rod is connected to the clamping ram such that movement of the main piston toward the closed position causes the charge piston to discharge fluid from the charge cylinder into the clamping cylinder. The dimensions of the clamping piston, the clamping ram, the booster ram and the charge piston are such that pressure within the clamping cylinder and the charge cylinder has the net effect of biasing the main piston from the open position toward the closed position.

DETAILED DESCRIPTION OF THE PREFERRED EMBODIMENTS

Figure 1:
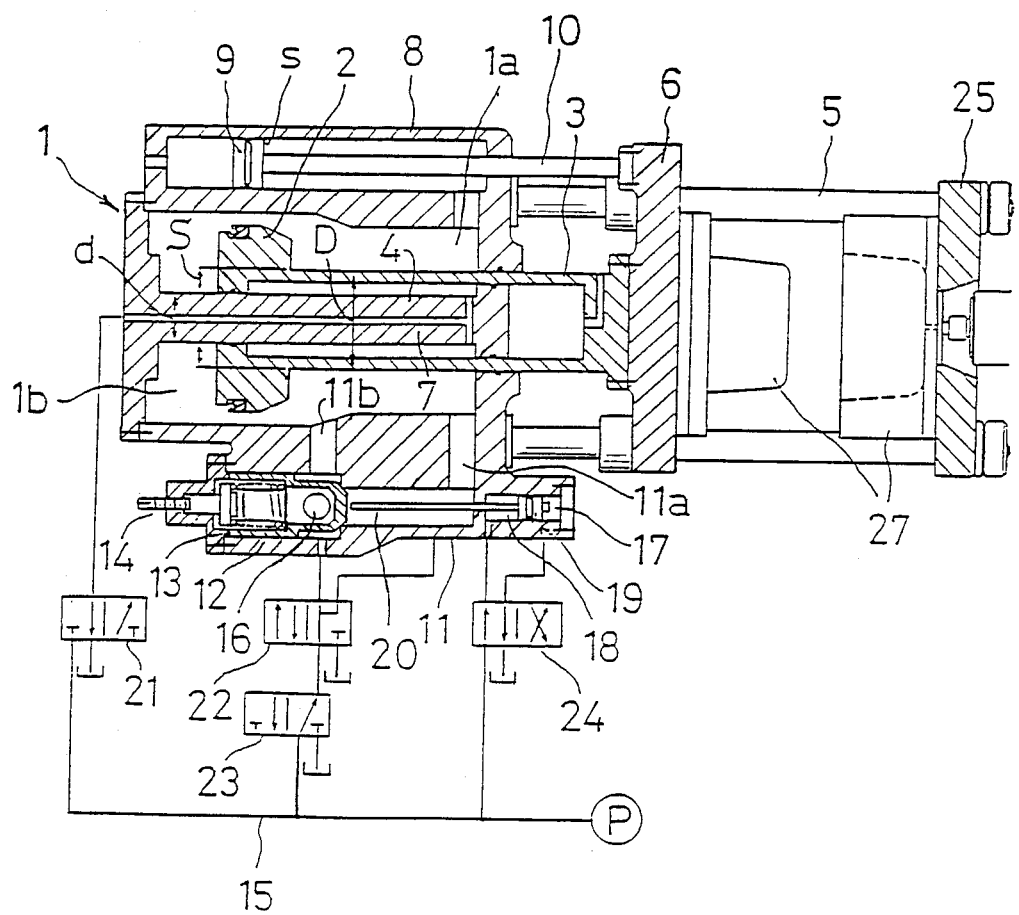
FIG. 1 is a schematic sectional side view of a clamping mechanism in accordance with the invention, in which a mold is open.

Reference numeral 1 designates a clamping cylinder, in which an internal diameter of a rear chamber 1b is larger than an internal diameter of a front chamber 1a.

Reference numeral 2 designates a piston formed at the rear end of a clamping ram 3 and having an external diameter adapted for the front chamber 1a. A booster ram 4 is coaxially inserted into the clamping ram 3. The booster ram 4 is centrally located within the rear chamber 1b. The booster ram 4 has a hydraulic passage 7.

The piston 2 has a front pressure receiving surface and a rear pressure receiving surface. The area of the rear pressure receiving surface is equal to the area of the front pressure receiving surface plus an end area S. That is, the diameter d of the booster ram 4 is smaller than the diameter D of the clamping ram 3. The clamping ram 3 is moved forward by hydraulic force within the clamping cylinder 1 due to the difference in area between the rear and front surfaces of the piston 2, i.e., the end area S.

The clamping ram 3 projects through a side wall of the cylinder 1. A movable plate 6 is connected to and thereby moved by the front end of the clamping ram 3. The movable plate 6 is guided by a tie bar 5.

Reference numeral 8 designates a charge cylinder. The charge cylinder 8 communicates with the front chamber 1a and is aligned with the side of the clamping cylinder 1. A piston 9 is located within the charge cylinder 8. The piston 9 has a pressure receiving area s. The area s is smaller than the area S. A piston rod 10 for moving the piston 9 is connected to the movable plate 6 along with the clamping ram 3.

Reference numeral 11 designates a large diameter passage provided on the side of the cylinder. The passage 11 connects the front chamber 1a to a front portion of the rear chamber 1b. The passage 11 has a passage 11a on the front chamber side of the cylinder 1 and a passage 11b on the rear chamber side of the cylinder 1. The passages 11a and 11b can be cut off from each other by a valve member 12 provided in the passage 11b.

The valve member 12 is a check valve. That is, the valve member 12 is always biased in a valve closing direction by a spring member 13. The force of the spring member 13 can be suitably adjusted by a screw 14. The valve member 12 is in communication with a hydraulic circuit 15 by a hole 16 which is bored in the side of the valve member 12.

The valve member 12 is opened when pressure within the passage 11a exceeds the force of the spring 13. The valve member 12 can also be opened by an operating device 17. The operating device 17 is composed of a hydraulic cylinder 18 and a rod 20 within a passage connected to a piston 19.

The hydraulic circuit 15 is connected to the passage 7 through a switching valve 21, the passage 11 through switching valves 22 and 23, and the operating device 17 through a switching valve 24.

Reference numeral 25 designates a fixed plate, and 27 is a mold.

When the mold 27 is open (FIG. 1) and when pressurized oil is supplied to the rear chamber 1b, pressure on the end area S is greater than pressure exerted in the opposite direction against the surface s. Accordingly, the piston 2 moves toward the front chamber 1a. The charge piston 9 is integral with the piston 2 and therefore moves forward with the piston 2. This causes oil to flow from the cylinder 8 into the front chamber 1a. The oil from the cylinder 8 along with the oil already within the front chamber 1a flows without resistance toward the rear chamber 1b through the clearance between the piston 2 and the wall of the rear chamber 1b.

Figure 2:
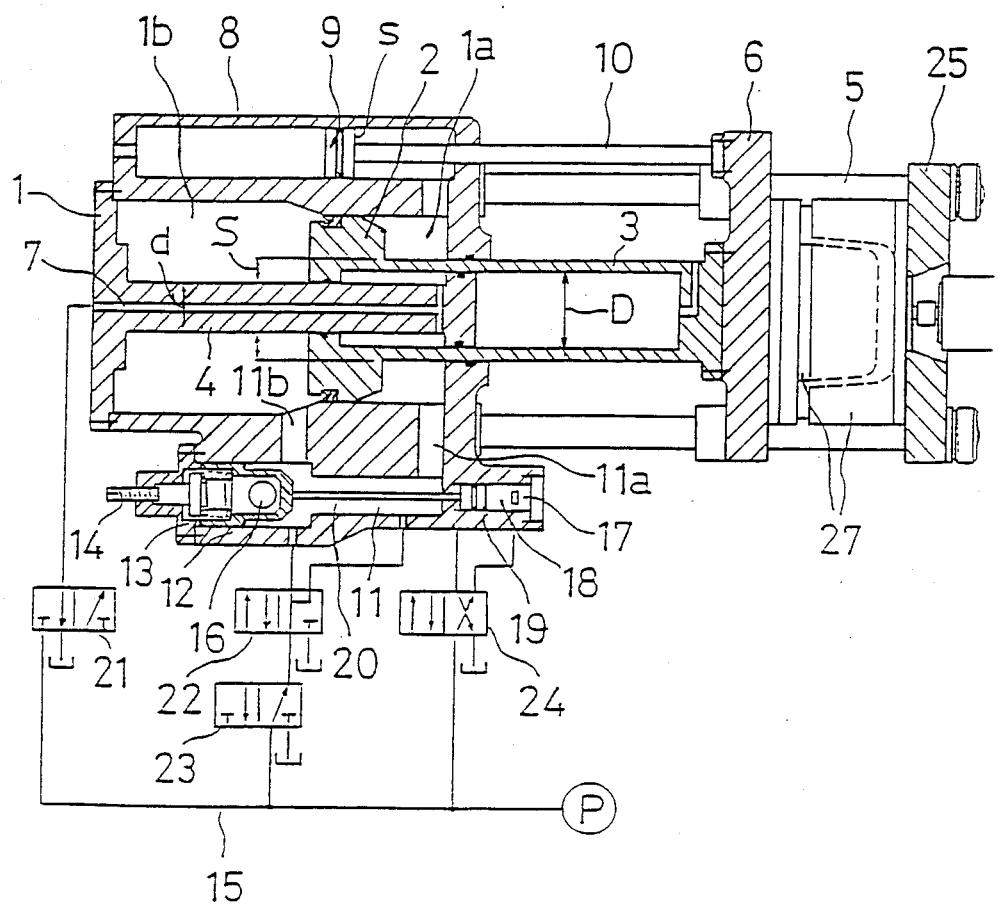
FIG. 2 is a schematic sectional side view of the mechanism of FIG. 1, with the mold closed.

When the front end of the piston 2 reaches the front chamber 1a, as shown in FIG. 2, there is no longer a clearance around the outermost periphery of the piston 2. The piston 2 fits tightly against the wall of the front chamber 1a. However, at that time, the operating device 17 is actuated by pressurized oil to advance the rod 20 and open the valve member 12 against the force of the spring member 13. The front chamber 1a thereby comes into communication with the rear chamber 1b, and the oil from the charge cylinder 8 and oil from the front chamber 1a flows through the passage 11 to the rear chamber 1b. As a result, there is little resistance caused by pressurized oil in the front chamber 1a.

When the operating device 17 is hydraulically actuated to return the rod 20 to its original closed position, the valve member 12 is returned to an equilibrium position between the spring pressure and the oil pressure, whereby the passage 11 slows down the mold closing speed. When the forward movement of the piston 2 stops, the passage 11a is connected to the drain by the switching valve 22. This reduces the pressure within the passage 11a whereby the valve member 12 cuts off the passage 11. The rear chamber 1b is then unilaterally pressurized to assume a clamping state.

To open the mold upon the completion of clamping, the valve member 12 is opened such that the front chamber 1a and the rear chamber 1b are in communication with each other through the passage 11. Pressure oil is then supplied to the booster ram 4, causing the clamping ram 3 (along with the movable plate 6) to move backward at high speed. The piston rod 10 moves backward with the plate 6, drawing oil into the charge cylinder 8 from the front chamber 1a. Oil is then stored in the charge cylinder 8 for the succeeding high-speed mold closing.

Figure 3:
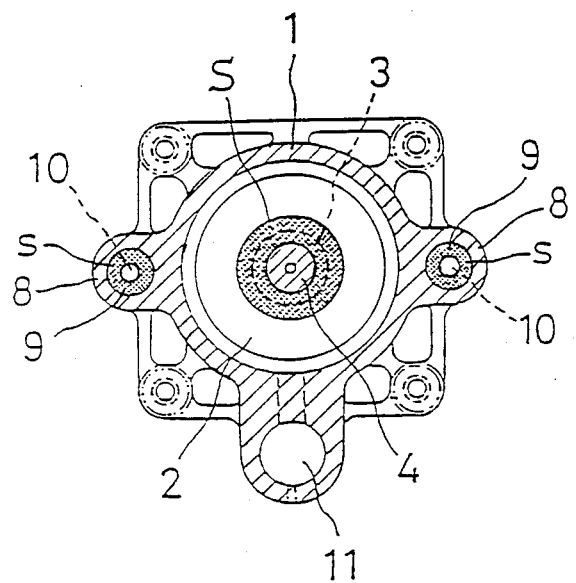
FIG. 3 is a sectional end view of the mechanism of FIG. 1.

The charge cylinder 8 is preferably located on both sides of the clamping cylinder 1 as shown in FIG. 3. In this case, a total charge area s (the sum of two areas) is smaller than the end area S.

Figure 5:
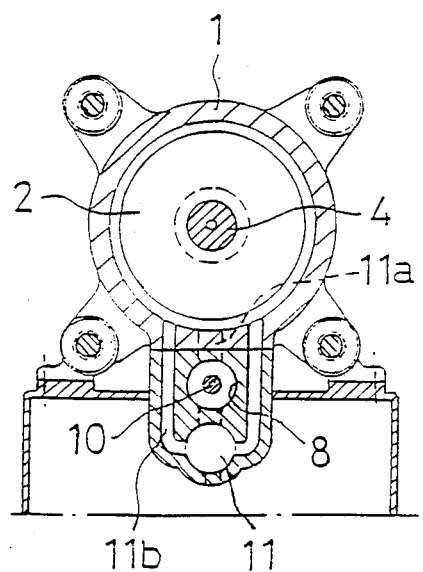
FIG. 5 is a sectional end view of the mechanism of FIG. 4.
Figure 6:
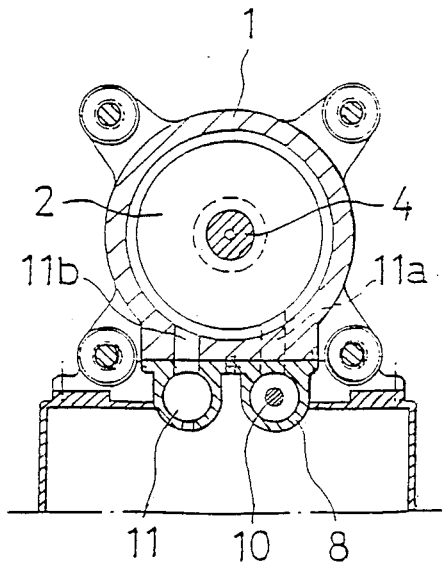
FIG. 6 is a sectional end view of another clamping mechanism in accordance with the invention.
Figure 4:
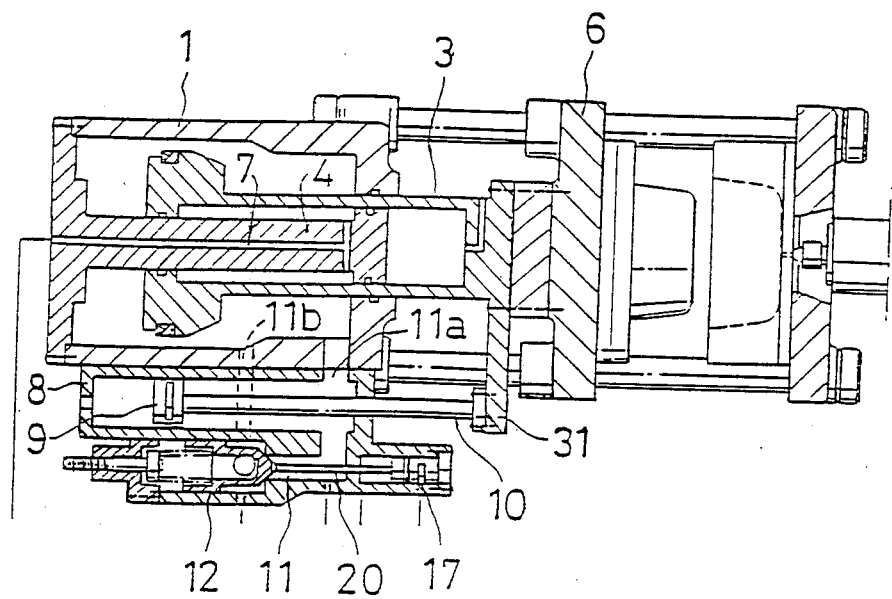
FIG. 4 is a schematic sectional side view of another clamping mechanism in accordance with the invention, in which a mold is open.

The embodiments shown in FIGS. 4, 5 and 6 use one charge cylinder 8, with the cylinder 8 being located underneath the clamping cylinder 1.

In the embodiments shown in FIGS. 4 and 5, the charge cylinder 8 and the pressure oil passage 11 are provided above and below the clamping cylinder 1, respectively, and a piston rod 10 is connected to an arm 31 which is directed downwardly from the front of the clamping ram 3. The passage 11a communicates the charge cylinder 8 with the front chamber 1a, and the passage 11b extends between the rear chamber 1b and both sides of the charge cylinder 8 (FIG. 5).

In the embodiment shown in FIG. 6, the charge cylinder 8 and the passage 11 are parallel to each other and beneath the clamping cylinder 1.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A clamping mechanism for use within an injection molding machine, the mechanism comprising:
   a clamping cylinder with a front chamber and a rear chamber, the front chamber having an internal diameter, the rear chamber having an internal diameter, the internal diameter of the rear chamber being greater than the internal diameter of the front chamber;
   a main piston located within the clamping cylinder, the main piston being movable within the clamping cylinder between an open position, an intermediate position and a closed position, the main piston being located within the rear chamber when the main piston is in the open position, the main piston being located within the front chamber when the main piston is in the intermediate position, the main piston being located within the front chamber when the main piston is in the closed position, the main piston having an outermost periphery, the outermost periphery of the main piston having a diameter, the diameter of the outermost periphery of the main piston being less than the internal diameter of the rear chamber of the clamping cylinder such that fluid flows around the outermost periphery of the main piston when the main piston moves from the open position to the intermediate position, the diameter of the outermost periphery of the main piston being equal to the internal diameter of the front chamber of the clamping cylinder such that fluid cannot flow around the outermost periphery of the main piston when the main piston moves from the intermediate position to the closed position;

a clamping ram which is fixed to the main piston;

a booster ram which is coaxial with the clamping ram, a portion of the booster ram being located inside of the clamping ram;

charging means supplying fluid to and receiving fluid from the clamping cylinder, the charging means including a charge cylinder which is in communication with the clamping cylinder, a charge piston which is located within the charge cylinder, and which is movable within the charge cylinder, a charge piston rod which is fixed to the charge piston, the charge piston rod being connected to the clamping ram such that movement of the main piston toward the closed position causes the charge piston to discharge fluid from the charge cylinder into the clamping cylinder; and a large diameter passage which extends outside of the clamping cylinder, the large diameter passage being connected to the front and rear chambers of the clamping cylinder such that fluid flows through the large diameter passage from the front chamber to the rear chamber when the main piston moves from the intermediate position to the closed position;

wherein the dimensions of the main piston, the clamping ram, the booster ram and the charge piston are such that pressure within the clamping cylinder and the charge cylinder has a net effect of biasing the main piston from the open position toward the closed position.

2. A clamping mechanism in accordance with claim 1, further comprising a valve located within the large diameter passage and control means for controlling the valve.

3. A clamping mechanism in accordance with claim 2, wherein the control means includes a spring for biasing the valve in a first direction to close the large diameter passage and opening means for moving the valve in a second, opposite direction to open the large diameter passage.

4. A clamping mechanism in accordance with claim 3, wherein the opening means includes a control rod, the opening means being adapted to move the control rod in the first direction as the main piston approaches the closed position.

5. A clamping mechanism in accordance with claim 4, further comprising means for draining fluid from in front of the main piston when the large diameter passage is closed such that an increased clamping force is applied to the clamping ram.

6. A clamping mechanism in accordance with claim 1, wherein the charge piston rod is parallel to the clamping ram.

7. A clamping mechanism in accordance with claim 1, wherein a cross sectional area of the clamping ram is greater than a cross sectional area of the booster ram.

8. A clamping mechanism in accordance with claim 7, wherein the booster ram has a coaxial passage therethrough for supplying fluid between the booster ram and the clamping ram to move the main piston toward the open position.

9. A clamping mechanism in accordance with claim 1, wherein the charge cylinder is located underneath the clamping cylinder.

10. A clamping mechanism in accordance with claim 9, further comprising an arm which extends downwardly from the clamping ram, the arm connecting the clamping ram to the charge piston rod.

11. A clamping mechanism in accordance with claim 1, wherein the charging means includes an additional charge cylinder.

12. An injection molding machine, the machine comprising:
  (A) a mold which includes a fixed plate and a movable plate; and
  (B) a clamping mechanism for opening and closing the mold, the clamping mechanism including:
    (a) a clamping cylinder with a front chamber and a rear chamber, the front chamber having an internal diameter, the rear chamber having an internal diameter, the internal diameter of the rear chamber being greater than the internal diameter of the front chamber;
    (b) a main piston located within the clamping cylinder, the main piston being movable within the clamping cylinder between the open position, an intermediate position and a closed position, the main piston being located within the rear chamber when the main piston is in the open position, the main piston being located within the front chamber when the main piston is in the intermediate position, the main piston being located within the front chamber when the main piston is in the closed position, the main piston having an outermost periphery, the outermost periphery of the main piston having a diameter, the diameter of the outermost periphery of the main piston being less than the internal diameter of the rear chamber of the clamping cylinder such that fluid flows around the outermost periphery of the main piston when the main piston moves from the open position to the intermediate position, the diameter of the outermost periphery of the main piston being equal to the internal diameter of the front chamber of the clamping cylinder such that fluid cannot flow around the outermost periphery of the main piston when the main piston moves from the intermediate position to the closed position;
    (c) a clamping ram which is fixed to the main piston and which is fixed to the movable plate;
    (d) a booster ram which is coaxial with the clamping ram, a portion of the booster ram being located inside of the clamping ram;
    (e) charging means supplying fluid to and receiving fluid from the clamping cylinder, the charging means including a charge cylinder which is in communication with the clamping cylinder, a charge piston which is located within the charge cylinder and which is movable within the charge cylinder, a charge piston rod which is fixed to the charge piston, the charge piston rod being connected to the movable plate such that movement of the main piston toward the closed position causes the charge piston to discharge fluid from the charge cylinder into the clamping cylinder; and
    (f) a large diameter passage which extends outside of the clamping cylinder, the large diameter passage being connected to the front and rear chamber of the clamping cylinder such that fluid flows through the large diameter passage from the front chamber to the rear chamber when the main piston moves from the intermediate position to the closed position;

wherein the dimensions of the main piston, the clamping ram, the booster ram and the charge piston are such that pressure within the clamping cylinder and the charge cylinder has a net effect of biasing the main piston from the open position toward the closed position.

* * * * *